(12) United States Patent
Derrieu et al.

(10) Patent No.: US 9,681,642 B2
(45) Date of Patent: Jun. 20, 2017

(54) EDIBLE, CHEWABLE OBJECT FOR CARNIVOROUS PETS AND METHOD OF CONTROLLING THE HYGIENE OF THE ORAL CAVITY OF SAID PETS USING ONE SUCH OBJECT

(75) Inventors: Guy Derrieu, Cagnes sur Mer (FR); Nathalie Delhom, Vence (FR)

(73) Assignee: VIRBAC, Carros (FR)

( * ) Notice: Subject to any disclaimer, the term of this patent is extended or adjusted under 35 U.S.C. 154(b) by 2138 days.

(21) Appl. No.: 10/541,217

(22) PCT Filed: Dec. 22, 2003

(86) PCT No.: PCT/FR03/03859
§ 371 (c)(1),
(2), (4) Date: Jan. 6, 2006

(87) PCT Pub. No.: WO2004/062358
PCT Pub. Date: Jul. 29, 2004

(65) Prior Publication Data
US 2006/0141105 A1    Jun. 29, 2006

(30) Foreign Application Priority Data

Dec. 30, 2002  (FR) .................................... 02 16838

(51) Int. Cl.
*A61Q 11/00* (2006.01)
*A01K 29/00* (2006.01)
*A01K 15/02* (2006.01)

(52) U.S. Cl.
CPC .......... *A01K 15/026* (2013.01); *A01K 15/025* (2013.01); *A61Q 11/00* (2013.01)

(58) Field of Classification Search
CPC ..... A61Q 11/00; A01K 15/026; A01K 15/025
See application file for complete search history.

(56) References Cited

U.S. PATENT DOCUMENTS

| 4,802,444 | A | * | 2/1989 | Markham et al. ............ 119/710 |
| 5,114,704 | A | * | 5/1992 | Spanier et al. ................. 424/57 |
| 5,263,436 | A | * | 11/1993 | Axelrod ........................ 119/710 |
| 5,947,061 | A | | 9/1999 | Fields et al. |
| 6,148,771 | A | * | 11/2000 | Costello ....................... 119/709 |
| 6,228,402 | B1 | | 5/2001 | Peldyak et al. |
| 6,360,696 | B1 | | 3/2002 | Hunt et al. |
| 6,365,133 | B1 | * | 4/2002 | Rich .............................. 424/49 |
| 6,379,725 | B1 | * | 4/2002 | Wang et al. ................... 426/72 |
| D492,836 | S | * | 7/2004 | Lawrenson ................... D1/199 |

FOREIGN PATENT DOCUMENTS

GB    2321383 A  *  7/1998
GB    2 359 746 A    9/2001

* cited by examiner

*Primary Examiner* — Frederick Krass
*Assistant Examiner* — Tracy Liu
(74) *Attorney, Agent, or Firm* — Clark & Brody

(57) ABSTRACT

The invention relates to a chewable object for carnivorous pets. The inventive object (1) is provided with an elongated shape and comprises a chewable, edible and digestible substance. The invention is characterised in that the shape of the object (1) comprises at least two dihedrals (d1, d2) having edges (a1, a2) which essentially extend along the entire length of the object.

19 Claims, 4 Drawing Sheets

Figure 1:
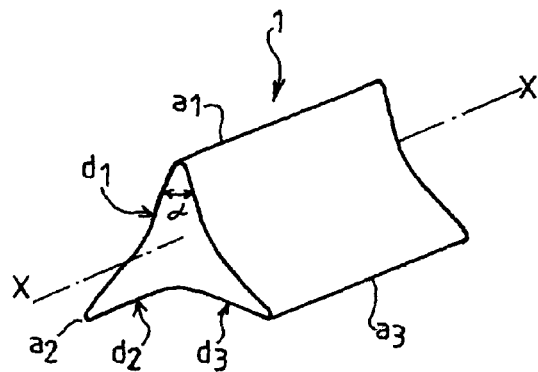

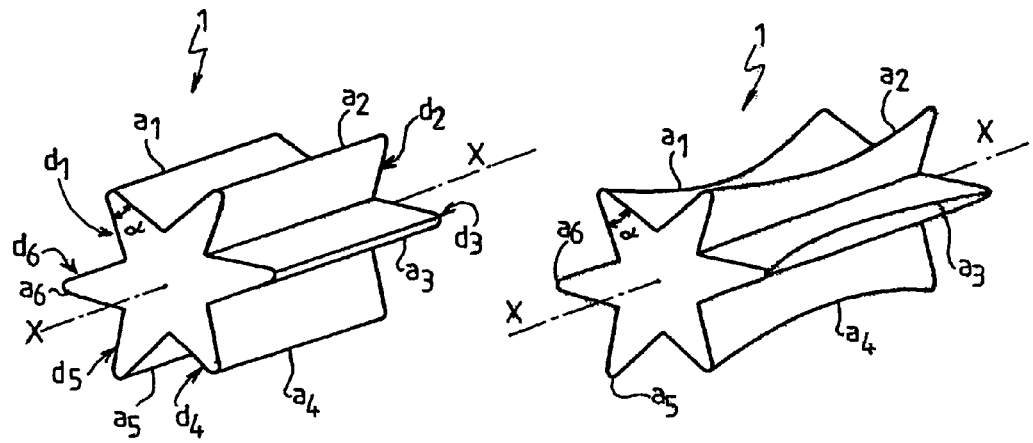
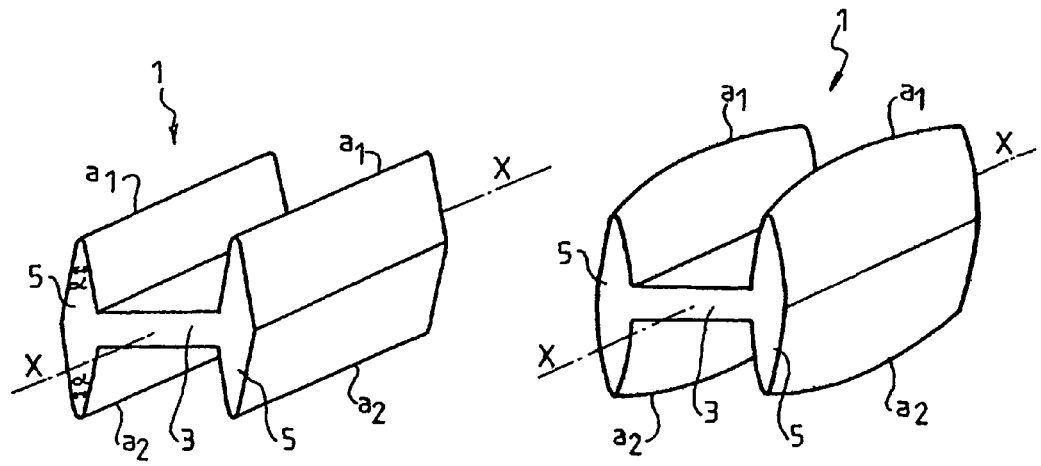

EDIBLE, CHEWABLE OBJECT FOR CARNIVOROUS PETS AND METHOD OF CONTROLLING THE HYGIENE OF THE ORAL CAVITY OF SAID PETS USING ONE SUCH OBJECT

This application is the national stage of International Application Number PCT/FR2003/003859, filed Dec. 22, 2003, which was published in French, and claims priority of France Application Number 02/16838, filed Dec. 30, 2002.

The invention relates to an edible object for pets, and a method of controlling the hygiene of the oral cavity of pets using one such object.

Like human beings, carnivorous pets such as dogs and cats are subject to mouth—dental problems. These problems can lead to various affections in the oral cavity at the gingiva and the teeth, for example such as invisible bacterial plaque that forms on the surface of the teeth. Mouth—dental hygiene of dogs and other similar pets is often deficient because it is impossible to clean their teeth efficiently with appropriate toothpaste products, in the same way as is done by man.

Dogs have 42 teeth. There are four different types of teeth, namely the incisors, the canines, the premolars and molars. Incisors are used mainly for picking up food and for cleaning (nibbling the skin). Canines are used mainly for defence and attack, and to tear pieces of flesh to be eaten. Premolars are used mainly to cut food into small pieces. Molars are used to grind and chew food in order to obtain small pieces that can be swallowed.

When a dog chews an object or food, this action is done mainly using the posterior teeth. More specifically, the teeth used in this action are the carnassials composed of the four upper premolars and the first lower molar.

Dental plaque consists of food debris and bacteria. It appears at the junction of the gingiva and the tooth in the form of a yellowish film. A sugar-rich food, bad position of the teeth, inflammation of the gingiva and lack of chewing facilitates its appearance. Starting from 2-3 years old, mineralisation of this plaque causes a tartar deposit. This results in bad breath, encourages gingiva disease and loose teeth. Gingiva diseases are painful and can contribute to heart, liver and kidney diseases. Gingivitis or inflammation of the marginal gingiva, are lesions confined to tissues in the gingival crest. They result in redness of the gingiva, bleeding, a local oedema and sensitive gingiva. They are essentially due to substances derived from microbial plaque that accumulates close to the gingival crevice. Experimental gingivitis may be caused by the lack of hygiene measures. Experimentally, methodical daily disinfection of the tooth necks of a dog keeps gingival inflammation low. Clinical signals of gingival inflammation will increase as soon as the local disinfection disappears. There is a direct relation between accumulation of plaque and the development of gingivitis. Gingivitis is reversible. Gingivitis will take longer to regress if it appeared quickly. A small quantity of bacterial plaque composed mainly of coccus and Gram+rods is always present in a clinically healthy gingiva. If plaque is allowed to accumulate, its composition changes. Gram- bacteria and fusiform and filamentous bacteria begin to appear. They are followed by spirillas and spirochetes. These micro-organisms will disappear first when hygiene measures are resumed. The inflammatory reaction observed in the conjunctive tissue subjacent to the junction epithelium is related to the permeability of this epithelium to bacterial products. Other local or systemic factors encourage the accumulation or retention of plaque, or increase the susceptibility of the gingival tissue to microbial attack. Lesions may be caused by nutritional problems, for example induced by endocrine diseases associated with generalised infections or induced by medical agents. Gingivitis is also classified into lesions with local origins or related to systemic factors. The apparent lack of the cause is denoted as being idiopathic. These lesions may remain stable for indefinite periods of months or years. They may be reversible or they may advance during acute inflammatory episodes. In chronic lesions, there are different bacterial species such as *Fusobacterium, Villonella, Campylobacter* and *Prevotella* intermedia. A number of gingivitis type lesions can evolve into parodontitis. Parodontitis consists of deep periondontium lesions with infectious etiology, with inflammation symptoms that destroy tooth support tissues; the alveolar bone and fibres anchoring the root into the gingiva and the bone. Parodontitis is a multi-factorial disease due firstly to conjunction of bacteria, and secondly an intense inflammatory response. The bacteria responsible cause acute or chronic tissue destruction that can be observed. Specific environment and genetic factors determine the susceptibility of the patient to develop a pathogenic bacterial flora, an infection and a destructive inflammatory response.

Firstly due to the shape and arrangement of the posterior teeth and secondly to the opening of zygomatics and parotidean salivary ducts just above the upper posterior teeth, dental plaque and tartar and calculi accumulate preferably on the posterior teeth and more particularly on the upper posterior teeth. More specifically, tartar accumulates on the lateral surfaces of the posterior teeth; the third and the fourth upper premolars, the first upper molar, the fourth lower premolar and the first lower molar.

Cats have 30 permanent teeth. Their teeth are classified according to their function:
  incisors: to cut, gnaw and perform delicate work;
  canines: to hold, catch and tear;
  premolars: to cut, hold and tear; and
  molars: to grind.

A cat has the teeth of a carnivore, with 12 incisors, 4 canines, 10 premolars and 4 molars. The carnassials are the cat's most efficient teeth for grinding; the carnassials consist of the $4^{th}$ upper premolars and the lower molars (the first upper premolar does not exist in cats).

Wild animals have relatively clean teeth because when they dismember a carcass to eat it, considerable abrasion of their teeth occurs due to the skin, flesh, tendons, bones and the prey's fur. Nowadays, domestic carnivores eat canned food that is sticky and does not clean their teeth. Dry food and biscuits can help to clean the teeth, but they are not very efficient.

Development of oral pathologies; the first stage is deposition of plaque that often goes unnoticed. This is followed by a proliferation of bacteria, gingivitis, inflammation of the gingiva that develops and is followed by the formation of tartar due to minerals salts contained in the saliva, mainly calcium carbonate that will be fixed by bacteria. The inflammation process increases, anaerobic bacteria proliferate, white globules arrive in mass and create pockets of pus between the tooth and the gingiva. The gingiva separates, the tooth becomes loose and bad breath occurs. Caries that are frequent in human beings, are practically non-existent in pets.

For many years, veterinary surgeons have recommended that owners should brush the teeth of their pets regularly to reduce the tartar formed and to prevent or delay the appearance of diseases and possible loss of teeth. Several devices have been developed to attempt to eliminate plaque and tartar that tend to accumulate on the pet's teeth. These devices include various brush configurations that require that the pet's owner should clean the pet's teeth after each meal.

For information, documents U.S. Pat. Nos. 4,738,001, 5,273,425 and 5,944,516 describe examples of devices specially adapted to brush the teeth of a pet. Although this cleaning may be efficient, it is tedious because the pet is not always cooperative and consequently this type of operation is not continued for very long. There are similar disadvantages with the various scraping and massaging devices according to prior art.

Another solution is to give the pet a chewable device in the form of a non-edible toy to keep its teeth clean. Examples of this device are described in documents U.S. Pat. Nos. 4,513,014, 4,802,444, FR-2 696 074, U.S. Pat. Nos. 5,647,302, 6,148,771 and 6,305,326. Such a device is usually designed to resist strong and repeated chewing without deterioration, while the surfaces of the chewable toy scrape or rub the accumulated plaque and tartar. In playing with the device, the pet cleans its teeth. The disadvantages of these devices are specific to their limited efficiency. Their particular configurations and shapes often prevent satisfactory contact with the teeth surfaces and/or often have a limited ability to eliminate undesirable deposits when the contact occurs. Their action is limited particularly because these devices do not destroy the bacterial flora present. Furthermore, since it is a toy, the pet can leave it alone for a long period depending on its mood, or might lose it (and the owner will not necessarily notice), which does not satisfy the need for regularity in care of the oral cavity. Finally, a pet might abandon the toy in any place, and for example the toy could be picked up by a child, and it could be dangerous if this toy contains active agents such as medical substances.

A final solution consists of giving the pet an edible object for chewing, for which the components are sufficiently hard and abrasive so that the tooth surfaces are cleaned by friction while the material to be chewed breaks up during chewing. Difficulties appear in choosing an edible material that is sufficiently hard and abrasive. Such objects to be chewed must resist considerable manipulations and forces before breaking up into fragments such that a large portion of the pet's tooth surfaces are contacted before the material is swallowed.

Such chewable objects are described for example in the following documents:

document EP-0 552 897 describes a solid edible object composed of 30 to 60% by weight of dry material in a chewable flexible cellular starch matrix that incorporates 20 to 50% by weight of a cellulose fibrous material;

document U.S. Pat. No. 5,407,661 describes an edible, solid, unbaked and extruded chewable object for pets, with an inert and flexible cellular matrix containing cellulose fibrous material for reducing tartar, stains and plaque on dog's teeth;

document U.S. Pat. No. 5,419,283 describes an edible chewable object for pets composed of starch and biodegradable ethylene copolymer;

document U.S. Pat. No. 5,431,927 describes a solid, extruded food product for pets, that has a particular structure and composition (proteins, fat, carbohydrates, fibres and vitamins), document U.S. Pat. No. 5,500,239 also describing the process for manufacturing it;

document U.S. Pat. No. 6,379,725 describes a chewable edible object for pets made from animal and vegetable proteins;

document FR-2 747 570 describes a chewable anti-tartar composition in the shape of a bone;

documents U.S. Pat. Nos. 6,126,978 and 6,274,182 describe a process for making an object to be chewed consisting of an edible strip with variable hardness depending on the choice of the owner and a biodegradable strip for pets composed of polyesteramide and starch;

documents IE-970930, IE-970931, IE-970932 and GB-2 332 850 describe an extrusion—moulding process for obtaining an edible, easily digestible, nutritional and stable object that keeps its shape; and finally some documents such as FR-2 607 704, EP-0 272 968, U.S. Pat. Nos. 6,365,133 and 5 336 494 describe natural edible objects impregnated with or coated with different constituents, mainly antibacterial and anti-tartar constituents.

In most chewable edible objects according to prior art, the main characteristic of each invention lies in its different compositions, and the resulting shapes are usually attractive or decorative shapes most of which imitate the shape of a bone.

Therefore, it is desirable to have edible and digestible chewable objects, that combine the advantages of bones or edible chewable strips and also chewable toys described above when the pet chews them, but that overcome their disadvantages and defects, in other words that are particularly effective in reaching all parts of the oral cavity, particularly the interstices between the teeth for cleaning and treating this oral cavity, for cleaning the entire surface of the teeth and eliminating plaque and tartar from the teeth and preventing the reappearance of these different factors that are prejudicial to mouth hygiene and tooth hygiene of pets, and particularly dogs and cats.

To achieve this, the invention proposes an edible chewable object for pets, this object being elongated and composed of a chewable, edible and digestive matrix, and being characterised in that the shape of the object includes at least two dihedrons, the edges of which extend approximately along the entire length of the object.

In general, in its prismatic section, the object is polygonal with n projecting angles forming n edges.

In general, the edges an of the dihedrons $d_n$ are approximately straight, or concave or convex, and they may be slightly rounded so as to avoid injuring the pet.

According to another characteristic of the invention, the dihedrons form an angle of between 0.5° and 70°, and preferably between 10° and 50°.

According to one example embodiment, the chewable object is globally in the shape of a bobbin with a central part and two end parts, each of which includes at least two projecting corners in the prismatic section to form two edges.

According to another example embodiment, the prismatic section of the chewable object is generally S-shaped with a central part and two end parts projecting from each side of the central part, each end part being provided with at least two projecting angles in the prismatic section to form two edges.

According to another example embodiment, the prismatic section of the chewable object is generally V-shaped, defined by two dihedrons to form three edges.

According to another example embodiment, the prismatic section of the chewable object is generally W-shaped, defined by at least four dihedrons to form at least five edges.

Finally, according to another example embodiment, the prismatic section of the chewable object is generally diamond shaped with two projecting angles to form two edges.

According to another characteristic of the invention, the composition of the matrix contains at least one active constituent, being a chemical or biological agent with either a local or systemic therapeutic, remedial or preventive activity, or an anti-tartar activity acting against caries, dental plaque, calcareous deposits, or an activity reinforcing the dental structure.

In general, the composition of the matrix of the chewable object contains at least one active constituent accounting for between 0.01% and 25% by weight of the total weight of the chewable object, such that the content of active constituents does not exceed 25% by weight of the total composition of the chewable object.

Preferably, the content of active constituents in the composition of the matrix does not exceed 10% by weight, the composition of the matrix may contain 2 to 5 active constituents, and the content of each active constituent in the composition of the matrix is between 0.01 and 5% by weight of the matrix.

According to one example embodiment, the active constituent(s) is (are) chosen from among fluorine salts such as sodium fluoride, sodium monofluorate, tin fluoride alone or mixed, inorganic pyrophosphates of mono or divalent alkaline metals (Na, K, Li, Ca, Mg, etc.) with formulas $M_{n+2}P_nO_{3n+1}$ where M is a monovalent metal or $M'_nP_nO_{3n+1}$ where M' is a divalent metal, such as tetrasodium pyrophosphate, tetrapotassium pyrophosphate, sodium acid pyrophosphate, calcium pyrophosphate, anti-microbials and/or anti-fungals and/or antiseptics such as chlorhexidine or its salts, bromochlorophene, triclosan, benzalkonium chloride, chlorobutanol, cetylpyridinium chloride, benzoic acid salts such as sodium benzoate, zinc diglyconate, potassium thiocyanate, vitamin C and its salts and particularly zinc ascorbate, citric acid and its salts, oxidoreductases such as glucose oxidase, galacto oxidase, lactoperoxidase, glycollate oxidase, lactate oxidase, L-gluconolactone oxidase, L-2hydroxyacide oxidase, aldehyde oxidase, xanthine oxidase, D-aspartate oxidase, L-amino acid oxidase, D-amino acid oxidase, monoamine oxidase, pyridoxaminephosphate oxidase, diamine oxidase, sulphite oxidase, and each of these oxidoreductases may be associated with a specific substrate such as glucose for glucose oxidase, such as D-glucose, D-galactose, L-sorbose, ethanol, tyramine, 1,4-diaminobutane, 6-hydroxy-L-nicotine, 6-hydroxy-D-nicotine, 2-aminophenol, glycollate, L-lactate, 2-deoxy-D-Glucose, L-gluconolactone, L-galactolactone, D-mannonolactone, L-2hydroxyisocaproate, acetaldehyde, butyraldehyde, xanthine, D-aspartate, D-glutamate, L-aminoacids and D-aminoacids, enzymes such as lysozyme, lactoferrine, remineralising agents, tooth bleaching substances such as TC45/Bioglass®, natural or modified polysaccharides such as chitin, chitosan and its derivatives.

Furthermore, the composition of the matrix contains at least one abrasive agent and for example the abrasive agent is chosen from among silica derivatives such as hydrated silica, zirconium silicate, aluminium silicate or magnesium trisilicate; calcium carbonate; sodium bicarbonate; phosphate derivatives such as calcium dihydrogen phosphate ($Ca(H_2PO_4)_2$), calcium monohydrogen phosphate ($CaHPO_4$), magnesium—ammonium phosphate ($MgNH_4PO_4$) or calcium pyrophosphate ($Ca_2P_2O_7$); an alumina such as alumina trihydrate; pumice stone powder, finely ground marine limestone, bone powder.

The invention also proposes a method for achieving hygiene in the oral cavity and teeth of a carnivorous pet, using a chewable and digestible elongated shaped object, method characterised in that it consists of:
  initially, improving contact between the object and the teeth of the pet by the presence of edges that extend practically around the entire length of the object and the presence of components or abrasive agents contained in the matrix of the object, for mechanical cleaning of the teeth of the pet both on the surfaces and in interstices and/or cavities;
  in a second step, bringing the active constituents contained in the matrix of the object into contact with the cleaned teeth;
  in a third step, causing softening of the edges of the object that then act as a scraper with a flexible apron, after hydratation of the object by the pet's saliva; and
  in a fourth step, releasing all active constituents to bring them into contact with the pet's complete oral cavity by joint action of chewing the object that causes its disintegration and the presence of abundant saliva.

Furthermore, the method according to the invention consists of adapting the hardness of the matrix of the object as a function of the pet considered, choosing a hardness such that firstly the object (and particularly its edges) is sufficiently hard so that it is not crushed or fragmented when the pet begins to chew the object, and secondly to obtain progressive softening of the edges such that the abrasive effect on the teeth is sufficient, and to choose a hardness such that the object can be disintegrated under the effect of chewing and assimilated by the pet.

Thus, for objects to be chewed, the invention proposes specific shapes associated with matrices containing abrasive agents and active constituents with hardnesses specially adapted to firstly encourage contact between the devices and all parts of the oral cavity, and particular the teeth during the time necessary for mechanical cleaning of the teeth, including the surfaces and interstices and cavities, and secondly to disseminate active constituents when the device breaks, firstly after moisturisation by saliva and secondly after chewing, throughout the entire oral cavity and more particularly in the interstices. The shape makes it possible to reach places that are difficult to access, and to deposit active constituents when it is broken by chewing. Thus, components of the matrix such as abrasion agents and active substances are brought directly into contact with the areas to be treated.

Specifically, an edible, digestible and chewable object according to the invention enables the following:
  1) a mechanical cleaning action in order to reach all parts of the oral cavity and particularly the interstices, due to:
    a) a particularly adapted shape,
    b) the presence of abrasive agents in the composition, and
  2) a therapeutic activity, that is remedial but also preventive such as antimicrobial, anti-tartar, protection against the presence or appearance of dental plaque or bad breath due to the presence of components with an activity against sanitary and hygiene problems in the oral cavity or dentition, this activity being improved by the close contact set up between the object to be chewed and the areas to be treated.

The chewable object may advantageously be used for prevention and/or treatment of gingivitis and/or parodontitis of pets, for the prevention and/or treatment of tartar deposits in the oral cavity of pets, and to reduce the development of dental plaque.

Figure 2:
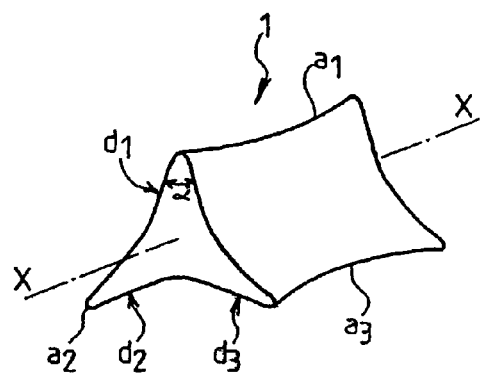
Figure 13:
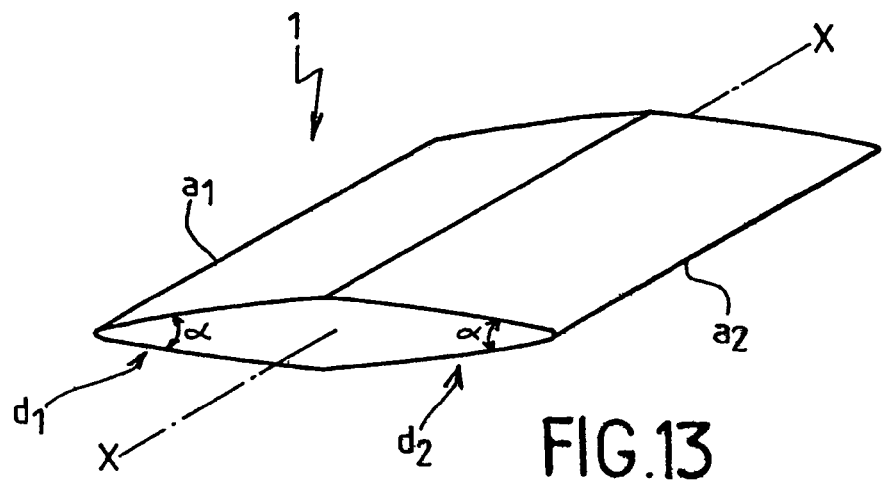
Figure 14:
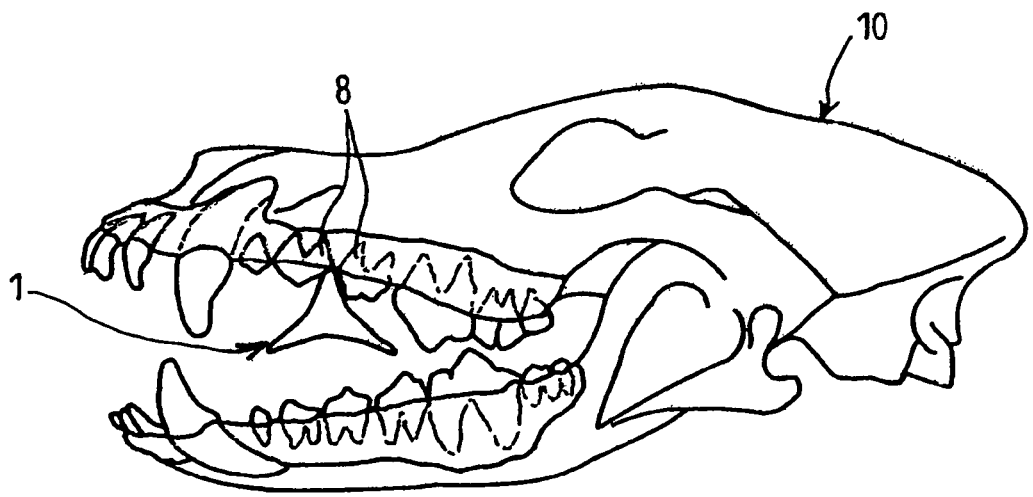

Other advantages, characteristics and details of the invention will become clear from the remainder of the description with reference to the attached drawings given only as examples and in which:

FIGS. 1 to 13 show perspective views to illustrate several embodiments of a chewable object according to the invention; and FIG. 14 is a simplified perspective view to illustrate action of the chewable object of the type shown in FIGS. 1 and 2 in the mouth of a pet.

The chewable object according to the invention is an object with an elongated shape formed from a chewable, edible and digestive matrix, to care for and for hygiene of the oral cavity and the teeth of pets.

One of the main characteristics of this elongated object is its shape, which includes at least two dihedrons, the two edges of which extend approximately over the entire length of the object. Different possible shapes with at least these two dihedrons will be described below with reference to FIGS. 1 to 13.

According to the example shown in FIG. 1, the object 1 to be chewed extends along a longitudinal axis X-X and has a globally triangular shape with three projecting angles $\alpha$ and three sides that are slightly concave in shape in its cross section in a plane perpendicular to this axis X-X. This cross section defines three dihedrons $d_1$, $d_2$ and $d_3$ with angle $\alpha$ and three approximately straight longitudinal edges $a_1$, $a_2$ and $a_3$ parallel to the X-X axis between the two ends of the chewable object 1. According to one variant shown in FIG. 2, the edges $a_1$, $a_2$ and $a_3$ are slightly concave, but they may also be slightly convex.

Figure 3:
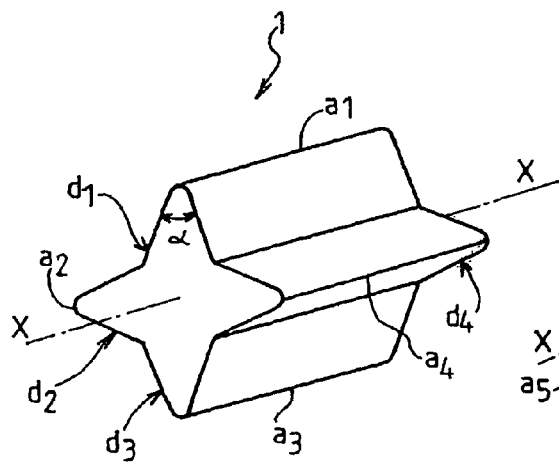
Figure 4:
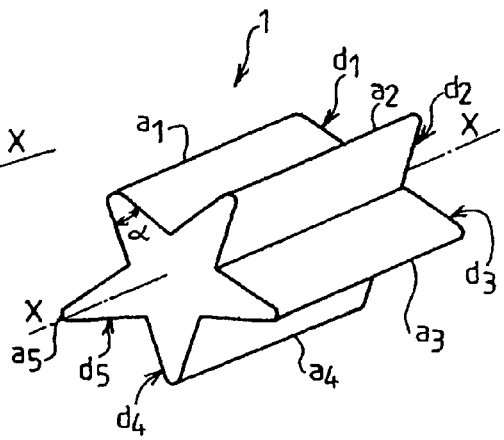

According to the example shown in FIG. 3, the chewable object 1 has a polygonal shaped cross section with four projecting angles $\alpha$ and eight sides, that defines four dihedrons $d_1$, $d_2$, $d_3$, and $d_4$ with an angle $\alpha$ and four longitudinal edges $a_1$, $a_2$, $a_3$, and $a_4$ that extend between the two ends of the chewable object 1. These edges $a_1$-$a_4$ may be straight or slightly concave or convex. According to the two variants shown in FIGS. 4 and 5, the polygonal shapes in the cross section have five and six projecting angles $\alpha$ with five and six longitudinal edges $a_1$-$a_5$ and $a_1$-$a_6$ respectively. These edges may be straight, convex or concave. FIG. 6 shows a variant of FIG. 5 with concave shaped edges $a_1$-$a_6$.

According to the example shown in FIG. 7, the chewable object 1 globally has the shape of a diabolo with a central part 3 with a rectangular cross section and two end parts 5 each of which has a diamond-shaped cross section with two projecting angles $\alpha$ and two approximately straight longitudinal edges $a_1$ and $a_2$, or convex according to the variant shown in FIG. 8.

Figure 9:
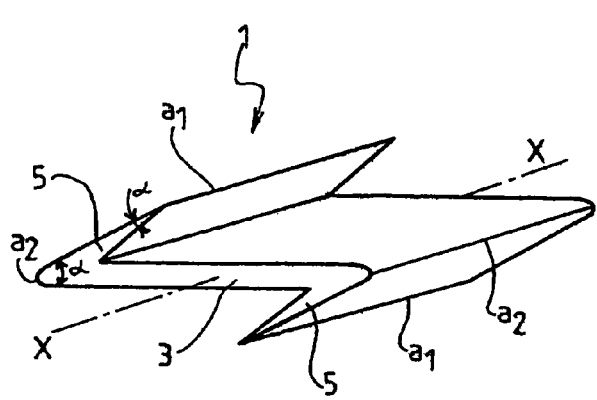

According to the example shown in FIG. 9, the chewable object 1 has a globally S shaped prismatic section with a rectangular central part 3 and two end parts 5 that project on each side of the central part 3, each end part 5 having at least two projecting angles $\alpha$ in the cross section, to form at least two edges $a_1$ and $a_2$.

Figure 10:
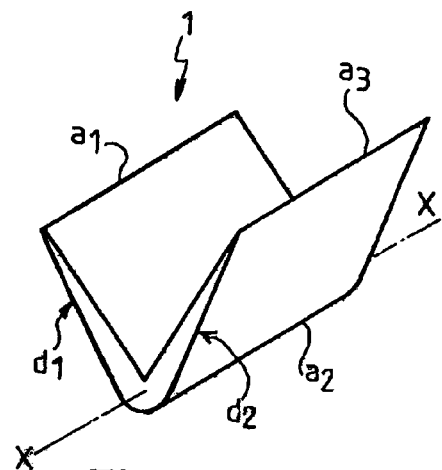

According to the example shown in FIG. 10, the chewable object 1 has a V-shaped cross section with two dihedrons $d_1$ and $d_2$ that define three longitudinal edges $a_1$, $a_2$, $a_3$.

Figure 11:
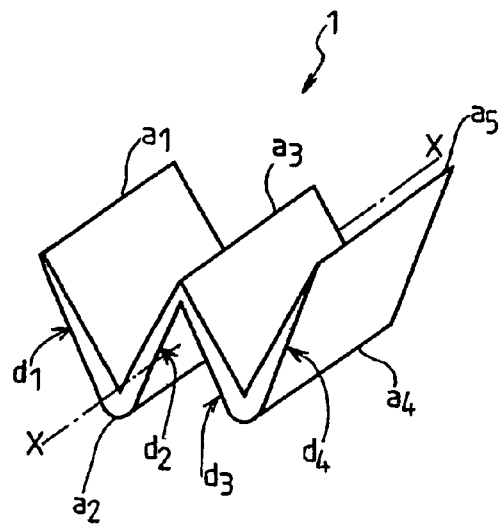
Figure 12:
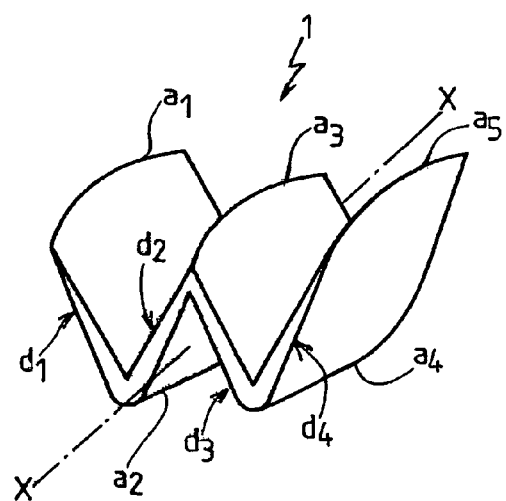

According to the example shown in FIG. 11, the chewable object 1 has a W-shaped cross section with four dihedrons $d_1$, $d_2$, $d_3$ and $d_4$ defining five approximately straight longitudinal edges $a_1$ to $a_5$, or convex according to the variant in FIG. 12.

According to the example in FIG. 13, the chewable object 1 has a diamond shaped cross section over practically its entire length, which is defined by two dihedrons $d_1$ and $d_2$ with two longitudinal edges $a_1$ and $a_2$.

In all the embodiments described above, the projecting angles $\alpha$ namely the angles of the dihedrons may be between 0.5° and 70°, and advantageously between 10° and 50°, the edges of these dihedrons may have a slightly rounded vertex to avoid injuring the pet. Moreover, the projecting angles $\alpha$ for a particular chewable object are not necessarily equal, and the shapes of the chewable objects may have a centre, a centre-line or a plane of symmetry.

In general, the chewable object may have two to twelve edges, and preferably from four to six edges, over its entire length. It may be manufactured using an extrusion, extrusion—moulding, moulding, calendering or cutting technique, or for example a compression technique.

It has been demonstrated that the pet can easily pick up the chewable object according to the invention, which is not the case for example with chewable strips described in prior art, which often have to be given to the pet manually.

Furthermore, due to the different types and sizes of pets' jaws depending on the species and the race, size and weight of chewable objects according to the invention will be adapted to the size of the pet that they are designed for. Therefore chewable objects are advantageously sized to be proportional to the size of the pet to maximise their efficiency and they are sufficiently large so that the pet cannot swallow them, and that they will not fit entirely inside their mouth.

Unexpectedly, such a chewable object acts sequentially as it is turned around in the pet's mouth and chewed. Firstly, it comes into contact with all parts of the oral cavity and mainly with the teeth at all angles and at various orientations. The different angles of the object according to the invention define areas that provide a larger contact area than a cylindrical shape and other shapes described in prior art and the corners enable the object according to the invention to act mainly between the teeth 8 as shown in FIG. 14, that shows a head 10 of a pet with a chewable object of the type described in FIG. 1 in its mouth. Thus, abrasion and action of active constituents take place in many frequently inaccessible locations. The acute vertices formed by the corners and the presence of abrasive components have the effect of eliminating plaque and tartar accumulated by scraping/abrasion of the teeth as the pet chews the object. At the same time, the active constituents are brought into direct contact with the surfaces of the teeth thus cleaned. Thus, the afflux of saliva that occurs during chewing, which in no way reduces the abrasive action of the object, causes initial softening of the edges that then act as a scraper with a flexible apron which completes contact with all surfaces, roughnesses and interstices of the oral cavity both by abrasive elements and by active constituents. Finally, when the matrix breaks down and in the presence of abundant saliva, the entire oral cavity is in contact with the released active components. Due to the edges of the object according to the invention that make it possible to enter all the interstices, once softened they will disintegrate and release all active constituents that can act locally, by contact or systemically.

The hardness of the object to be chewed according to the invention is another parameter that will vary as a function of the pet that will be given it. It must be such that the chewable object, and particularly its edges, are sufficiently hard so that they are not crushed or fragmented as soon as the pet begins to chew the object. Softening of the edges must be progressive and must occur after a sufficiently long time so that they could thus apply their abrasive effect on a large area of the teeth. However, the hardness of the chewable object according to the invention must eventually enable fragmentation of the object and assimilation by the pet. Preferably, the object according to the invention should soften and then disintegrate under the effect of mastication after a time between 30 seconds to 30 minutes, and preferably after a time between 1 minute and 10 minutes and even better after a time between 2 minutes and 6 minutes.

According to this invention, the matrix may be natural or synthetic and its composition may be chosen among edible and digestible compositions described in prior art mentioned in the preamble. Particular examples of materials that could be used in the composition of the matrix include casein, pea flour, corn starch, rice flour and/or cellulose derivatives. Furthermore, the composition of the matrix of the object to be chewed contains at least one active constituent accounting for between 0.01 and 25%, and preferably between 1 and 10% by weight of the total weight of the chewable object, such that the content of active constituents does not exceed 25% by weight of the total composition of the chewable object, and preferably does not exceed 10% by weight of the total composition of the chewable object.

An active constituent means any chemical or biological compound with either a local or systemic, therapeutic, remedial or preventive activity, or an activity such as anti-tartar, protection against caries, dental plaque, calculus deposits or an activity to reinforce the tooth structure.

According to one advantageous embodiment of the said composition of the matrix, the active constituents are advantageously chosen from among fluorine salts such as sodium fluoride, sodium monofluorate, tin fluoride alone or mixed; inorganic pyrophosphates of mono or divalent alkaline metals (Na, K, Li, Ca, Mg, etc.) with formulas $M_{n+2}P_nO_{3n+1}$ where M is a monovalent metal or $M'_nP_nO_{3n+1}$ where M' is a divalent metal such as tetrasodium pyrophosphate, tetrapotassium pyrophosphate, sodium acid pyrophosphate, calcium pyrophosphate; substances with an anti-microbial activity; substances with an anti-fungal activity, substances with an antiseptic activity such as chlorhexidine or its salts, bromochlorophene, triclosan, benzalkonium chloride, chlorobutanol, cetylpyridinium chloride; benzoic acid salts such as sodium benzoate; zinc digluconate; potassium thiocyanate; vitamin C and its salts and particularly zinc ascorbate; citric acid and its salts; oxidoreductases such as glucose oxidase, galacto oxidase, lactoperoxidase, glycollate oxidase, lactate oxidase, L-gluconolactone oxidase, L-2hydroxyacide oxidase, aldehyde oxidase, xanthine oxidase, D-aspartate oxidase, L-amino acid oxidase, D-amino acid oxidase, monoamine oxidase, pyridoxaminephosphate oxidase, diamine oxidase, sulphite oxidase, and each of these oxidoreductases may be associated with a specific substrate such as glucose for glucose oxidase, such as D-glucose, D-galactose, L-sorbose, ethanol, tyramine, 1,4-diaminobutane, 6-hydroxy-L-nicotine, 6-hydroxy-D-nicotine, 2-aminophenol, glycollate, L-lactate, 2-deoxy-D-Glucose, L-gluconolactone, L-galactolactone, D-mannonolactone, L-2hydroxyisocaproate, acetaldehyde, butyraldehyde, xanthine, D-aspartate, D-glutamate, L-aminoacids and D-aminoacids; enzymes such as lysozyme, lactoferrine; remineralising agents, tooth bleaching substances such as TC45/Bioglass®, natural or modified polysaccharides such as chitin, chitosan and its derivatives.

According to another advantageous embodiment of the said composition of the matrix, the abrasive action is at least partly due to one or several compounds advantageously chosen from among silica derivatives such as hydrated silica, zirconium silicate, aluminium silicate or magnesium trisilicate, calcium carbonate, sodium bicarbonate, phosphate derivatives such as calcium dihydrogen phosphate $(Ca(H_2PO_4)_2)$, calcium monohydrogen phosphate $(CaHPO_4)$, magnesium—ammonium phosphate $(MgNH_4PO_4)$ or calcium pyrophosphate $(Ca_2P_2O_7)$, an alumina such as alumina trihydrate; pumice stone powder, finely ground marine limestone, bone powder.

According to another advantageous embodiment of the said chewable object, the active component(s) may be added by immersion of the object into a solution containing the active component(s) followed by drying if necessary, or by vaporisation of this solution or suspension if one or several insoluble active component(s) are present, or by any other method known to those skilled in the art capable of impregnating or coating the object with one or more active component(s). The quantities of active component(s) are adjusted so that they do not present any risk for the pet, even if used with a maximum daily consumption consisting of maximum chewing and swallowing of the object.

According to another advantageous embodiment of the said composition of the matrix, it also comprises at least one of the following compounds: one or more flavours or tasting agents to make it more appetising and to increase the pet's interest in the chewable object, one or several wetting agents such as glycerine or propylene glycol, one or more preservation agents such as benzoic acid and its salts, sorbic acid and its salts, propionic acid and its salts, parabens and their salts, one or more odorising agents to hide bad breath such as composite synthetic or natural perfumes of flowers and/or fruit.

One preferred composition of the matrix of the chewable object according to the invention contains between 2 and 5 active components, each active component being between 0.01 and 5% by weight of the total weight of the chewable object, but the sum of these amounts shall not exceed 10% by weight of the total weight of the chewable object.

The invention also relates to a method of care and improving the hygiene of the oral cavity of a pet carnivore consisting of providing the pet with a chewable and edible object to efficiently physically (mainly mechanically) and chemically or biologically provide care against all aggression of the oral cavity or dentition such as the microbial flora that develops in the pet's mouth, tartar and all other calcareous and non-incrusted deposits between the teeth.

EXAMPLE 1

A matrix is prepared by mixing 30.5% of casein, 24% of pea flour, 6.5% of kaolin, 4.5% of beer yeast, 4.5% of d, l-methionine, 4.5% of magnesium stearate, 3.5% of guar, 1% of potassium thiocyanate, 1% of zirconium silicate, 1.42% of sodium citrate and 5.3% of a 20% aqueous solution (p/V) of chlorhexidine digluconate in the presence of 13.28% of water. Edible chewable objects with the shape shown in FIG. 5 according to the invention are obtained by extrusion—moulding. Three batches of different sizes, dimensions and weights of edible chewable objects, adapted to the size of the dog, are obtained, as follows:
  small dog: 8.5 cm long, weighing 25 g,
  medium-sized dog: 11.5 cm long, weighing 65 g, and
  large dog: 13.5 cm long, weighing 105 g.

EXAMPLE 2

A matrix is prepared by mixing 37% of corn starch, 22% of rice flour, 10% of glycerine, 8% of beer yeast, 7% of cellulose derivatives, 5.3% of a 20% aqueous solution (p/V)

of chlorexidine digluconate, 4% of corn cob, 2.28% of a 70% aqueous solution (p/V) of sorbitol, 1% of potassium thiocyanate, 1% of zirconium silicate and 1.42% of sodium citrate. Edible chewable objects with the shape shown in FIG. 5 according to the invention are obtained by extrusion. Three batches of edible chewable objects with different sizes, dimensions and weights adapted to the size of the dog are obtained, namely:
 small dog: 100 mm long, 15 mm wide, weighing 9 g
 medium-sized dog: 70 mm long, 28 mm wide, weighing 11 g,
 Large dog: 100 mm long, 28 mm wide, weighing 17 g.

EXAMPLE 3

Study of the action of the edible chewable object on the state of tartar development and/or prevention of the appearance of tartar.
1) Operating Method
 Two homogeneous groups (hereinafter called groups I and II—each containing 30 dogs with no restriction of race, age or sex, are selected from a weight range varying from 5 to 35 kg.
 Four classes of tartar development are considered in this study, called stages 1 to 4:

| Tartar stage | |
|---|---|
| STAGE | TARTAR |
| 4 | very severe |
| 3 | Severe |
| 2 | medium |
| 1 | low |

Three batches of conventionally shaped edible chewable bones are prepared by extrusion—moulding using the matrix described in FIG. 1, resembling a long bone comprising a diaphysis at the ends of which there are two epiphyses, with three different sizes, dimensions and weights adapted to the size of the dog, namely:
 small dog: 72 mm long, weighing 35 g,
 medium sized dog: 100 mm, weighing 65 g, and
 large sized dog: 110 mm, weighing 105 g.
 Each dog in group I received eight edible chewable objects according to the invention as described in example 1, per month. Dogs in group II received 8 edible chewable bones described above, per month.
 The different parameters listed below were monitored by owners and by veterinary surgeons.
 Parameters monitored by the owner during the first month of treatment for 1 hour every time that he gives the chewable object or the bone to the dog:
  picking up of the object or the bone by the pet/failure to pick up the object or bone by the pet,
  if picked up: chewing time of the object or the bone, and
  total consumption of the object or the bone/object or bone abandoned before being fully consumed.
 Parameters monitored by the veterinary surgeon during visits at 15, 30, 45, 60, 75 and 90 days after initial administration of the object or the bone:
  state of gingiva,
  state of dental plaque and the tartar development stage.
2) Results
 a) by owners Table 1 below describes results observed by owners, on presentation of the object according to the invention or the edible chewable bone:

TABLE 1

| | | Dogs in group I | Dogs in group II |
|---|---|---|---|
| OBJECT PICKED UP | YES | 240/240 | 240/240 |
| | NO | 0/240 | 0/240 |
| AVERAGE CHEWING TIME | | 8 minutes | 10 minutes |
| OBJECT CONSUMPTION | YES | 209/240 | 195/240 |
| | NO | 31/240 | 45/240 |

* If the pet does not pick up the object, the owner will remove it permanently after one hour.

b) By the Veterinary Surgeon
 Table 2 below illustrates the results observed during visits to the veterinary surgeon during the treatment.

TABLE 2

| | STAGE | INITIAL EXAMINATION | END OF TEST |
|---|---|---|---|
| Dogs in group I | 4 | 20% | 0% |
| | 3 | 50% | 6.66% |
| | 2 | 20% | 23.33% |
| | 1 | 10% | 70% |
| Dogs in group II | 4 | 20% | 3.33% |
| | 3 | 50% | 26.66% |
| | 2 | 20% | 43.33% |
| | 1 | 10% | 26.66% |

Chewable objects according to the invention or bones with the same composition and with an equivalent hardness show firstly a comparable acceptability by the pets regardless of the shape, and secondly they are swallowed in approximately the same manner (table 1).
 The results in table 2 demonstrate that the chewable object according to the invention has a much better action on the condition of the pets' dentition, 70% of pets are in stage 1, while with a conventional-shaped bone with the same composition as the chewable object, 26.6% of pets are in the stage 1. These results show that the shape of the edible chewable object gives better results due to the combination of physical, mechanical and chemical properties of the object to be chewed.

The invention claimed is:
1. Edible chewable object for pets, this object (1)-being elongated along a longitudinal axis and composed of a chewable, edible and digestive matrix, characterised in that the shape of the object (1) is that of a polygon in transverse cross section formed by at least two and no more than twelve dihedrons ($d_1$, $d_2$) extending between first and second ends of said object, each said dihedron being formed by two sides oriented to intersect in a substantially straight line parallel to the longitudinal axis and at a dihedral angle a of between 0.5° and 70°, said two sides forming a longitudinal edge ($a_1$, $a_2$) that extends approximately along the entire length of the object between said first and second ends of the object, the entire length of the object measured in the direction of the longitudinal axis being greater than its width measured in a direction transverse to the longitudinal axis, said sides of each dihedron being positioned so that said dihedral angles project away from a central portion of said object and the longitudinal edges form peripheral corners of the object, and in that the composition of the matrix contains at least one active constituent, being a chemical or biological agent with either a local or systemic therapeutic, remedial or preventive activity, or an anti-tartar activity acting against caries, dental plaque, calcareous deposits, or an activity reinforcing the dental structure, and in that the content of each active constituent in the composition of the matrix is between 0.01 and 5% by weight of the matrix.

2. Chewable object according to claim 1, characterised in that the edges ($a_1$, $a_2$) of the dihedrons ($d_1$, $d_2$) are approximately straight, or concave or convex.

3. Chewable object according to claim 1, characterised in that the edges ($a_1$, $a_2$) of the dihedrons ($d_1$, $d_2$) are rounded.

4. Chewable object according to claim 1, characterised in that it has the shape of a diabolo with a central part (3) and two end parts (5) each of which has a cross section with two projecting angles ($\alpha$) to form two edges $a_1$ and $a_2$.

5. Chewable object according to claim 1, characterised in that the chewable object (1) has a globally S shaped cross section with a central part (3) and two end parts (5) that project on each side of the central part (3), each end part having at least two projecting angles ($\alpha$) in the cross section, to form at least two edges ($a_1$ and $a_2$).

6. Chewable object according to claim 1, characterised in that the chewable object (1) has a globally V-shaped cross section with two dihedrons ($d_1$ and $d_2$) that define three edges ($a_1$, $a_2$, $a_3$).

7. Chewable object according to claim 1, characterised in that the chewable object (1) has a globally W-shaped cross section with four dihedrons ($d_1$, $d_2$, $d_3$, $d_4$) that define five longitudinal edges ($a_1$, $a_2$, $a_3$, $a_4$, $a_5$).

8. Chewable object according to claim 1, characterised in that the chewable object has a globally diamond-shaped cross section with two projecting angles ($\alpha$) to form two edges ($a_1$, $a_2$).

9. Chewable object according to claim 1, characterised in that the content of active constituents in the composition of the matrix does not exceed 10%.

10. Chewable object according to claim 1, characterised in that the composition of the matrix contains 2 to 5 active constituents.

11. Edible, chewable object according to claim 1, characterised in that said at least one active constituent is chosen from among fluorine salts; inorganic pyrophosphates of mono or divalent alkaline metals with formulas $M_{n+2}P_nO_{3n+1}$ where M is a monovalent metal or $M'_nP_nO_{3n+1}$ where M' is a divalent metal, anti-microbials and/or anti-fungals and/or antiseptics; bromochlorophene; triclosan; benzalkonium chloride; chlorobutanol; cetylpyridinium chloride; benzoic acid salts; zinc diglyconate; potassium thiocyanate; vitamin C and its salts; citric acid and its salts; oxidoreductases or oxidoreductases associated with a specific substrate; enzymes chosen amongst lysozyme and lactoferrine; remineralising agents; tooth bleaching substances; and natural or modified polysaccharides.

12. Chewable object according to claim 1, characterised in that the composition of the matrix contains at least one abrasive agent.

13. Chewable object according to claim 12, characterised in that the abrasive agent is chosen from among silica derivatives-chosen amongst hydrated silica, zirconium silicate, aluminium silicate or magnesium trisilicate; calcium carbonate; sodium bicarbonate; phosphate derivatives chosen amongst calcium dihydrogen phosphate ($Ca(H_2PO_4)_2$), calcium monohydrogen phosphate ($CaHPO_4$), magnesium—ammonium phosphate ($MgNH_4PO_4$) or calcium pyrophosphate ($Ca_2P_2O_7$); an alumina; pumice stone powder, finely ground marine limestone, bone powder.

14. Edible chewable object according to claim 1, characterised in that the composition of the matrix comprises at least one flavour, and/or at least one tasting agent, and/or at least one wetting agent and/or at least one preservation agent.

15. Edible chewable object according to claim 1, characterised in that it is produced by extrusion or by moulding or by extrusion—moulding.

16. Chewable object according to claim 1, characterised in that the dihedrons ($d_1$, $d_2$) form an angle $\alpha$ between 10° and 50°.

17. Edible, chewable object according to claim 11, wherein said fluorine salts are selected from the group consisting of sodium fluoride, sodium monofluorate, tin fluoride alone or mixed; said inorganic pyrophosphates of mono or divalent alkaline metals are selected from the group consisting of tetrasodium pyrophosphate, tetrapotassium pyrophosphate, sodium acid pyrophosphate, calcium pyrophosphate; said anti-microbials and/or anti-fungals and/or antiseptics comprise chlorhexidine or its salts; said benzoic acid salt comprises sodium benzoate; said vitamin C and its salts comprise zinc ascorbate; said oxidoreductases are selected from the group consisting of glucose oxidase, galacto oxidase, lactoperoxidase, glycollate oxidase, lactate oxidase, L-gluconolactone oxidase, L-2hydroxyacide oxidase, aldehyde oxidase, xanthine oxidasev, D-aspartate oxidase, L-amino acid oxidase, D-amino acid oxidase, monoamine oxidase, pyridoxaminephosphate oxidase, diamine oxidase, sulphite oxidase, and each of these oxidoreductases may be oxidoreductases associated with a specific substrate, said specific substrate being selected from the group consisting of D-glucose, D-galactose, L-sorbose, ethanol, tyramine, 1,4-diaminobutane, 6-hydroxy-L-nicotine, 6-hydroxy-D-nicotine, 2-aminophenol, glycollate, L-lactate, 2-deoxy-D-Glucose, L-gluconolactone, L-galactolactone, D-mannonolactone, L-2hydroxyisocaproate, acetaldehyde, butyraldehyde, xanthine, D-aspartate, D-glutamate, L-aminoacids and D-aminoacids.

18. An edible chewable object according to claim 1 wherein said dihedrons form the only corners of said object.

19. An edible chewable object according to claim 1 wherein at least two of said dihedrons are arranged symmetrically along a plane intersecting the longitudinal edges of the dihedrons.

* * * * *